July 2, 1957  R. M. CARRIER, JR., ET AL  2,797,796
BALANCING VIBRATING CONVEYORS
Filed Jan. 9, 1953  5 Sheets-Sheet 1
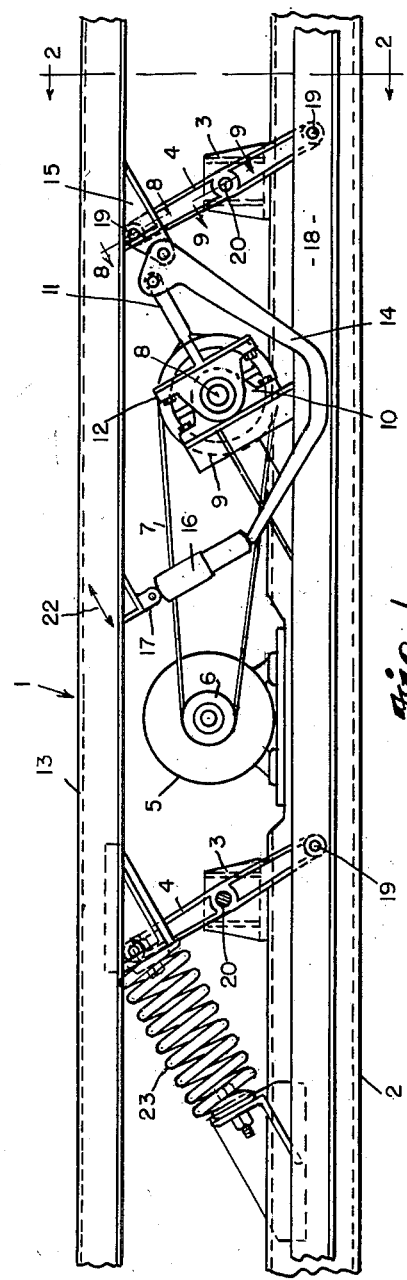
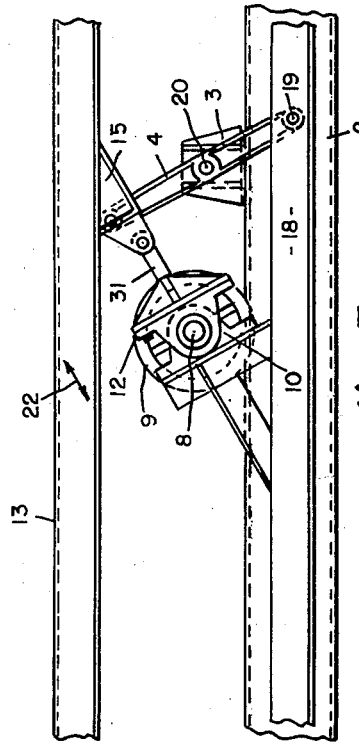
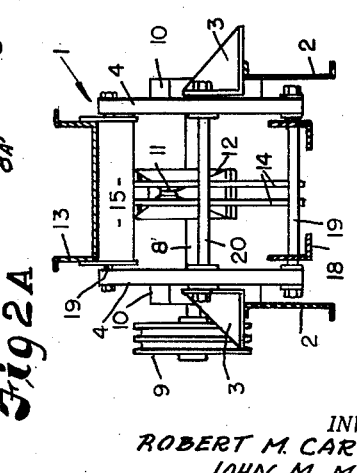
INVENTORS
ROBERT M. CARRIER, JR. +
BY JOHN M. MORRIS
Oberlin & Limbach
ATTORNEYS.

July 2, 1957  R. M. CARRIER, JR., ET AL  2,797,796
BALANCING VIBRATING CONVEYORS
Filed Jan. 9, 1953  5 Sheets-Sheet 2

INVENTORS
ROBERT M. CARRIER, JR. +
BY JOHN M. MORRIS
Oberlin + Limbach
ATTORNEYS.

United States Patent Office 2,797,796
Patented July 2, 1957

2,797,796
BALANCING VIBRATING CONVEYORS

Robert M. Carrier, Jr., and John M. Morris, Louisville, Ky., assignors to Carrier Conveyor Corporation, Louisville, Ky., a corporation Application January 9, 1953, Serial No. 330,458

14 Claims. (Cl. 198—220)

The present invention relates generally as indicated to balanced vibrating conveyors and, more particularly, to certain improvements in conveyor drive and resilient support mechanisms which have the following attributes:

1. Vibration of the conveyors is effected in resonance with the natural frequency of the resilient mountings whereby power requirements are but a fraction of that required to vibrate non-resiliently supported conveyors or resiliently supported conveyors which are operated at non-resonant frequency;

2. The vibration of the conveyors is maintained at a predetermined uniform amplitude under all load conditions to thereby eliminate damping under increased load and amplitude increase under reduced load;

3. The conveyors are floatably supported under the static effect of the conveyed load so that the weight of the vibrating components as well as that of the load are borne by the resilient mountings rather than by the drive means and, in this way, fatigue failure of the conveyors and drive means therefor is prevented;

4. The conveyor drive mechanisms are mounted for floating during the period when the power is disconnected therefrom so that the conveyor and the drive mechanism can more or less independently coast to a stop, the conveyor coming to rest by vibrating at constant frequency but at a gradually decreasing amplitude and the drive mechanism coming to rest at constant amplitude or stroke but at decreasing frequency or R. P. M., this floating of the drive mechanism serving to considerably reduce the effect of the inertia forces of the vibrating conveyor on the drive mechanism;

5. The driving thrust or reaction from the driving mechanism to the building or other conveyor supporting structure is either minimized or entirely eliminated; and 6. The lateral vibration of the conveyors is eliminated so as to avoid consequent erratic conveying action and reduction in conveying speed or capacity.

Other objects and advantages of the present invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view of a conveyor embodying the present improvements, a portion of the frame of the conveyor being cut away so as to more clearly illustrate the structure therebehind;

Fig. 2 is a cross-section view taken substantially along the line 2—2, Fig. 1;

Fig. 2A is an elevation view of the eccentric drive shaft;

Figs. 3 to 7 are views similar to Fig 1, except illustrating certain modifications in conveyor drive mechanisms;

Figure 8:
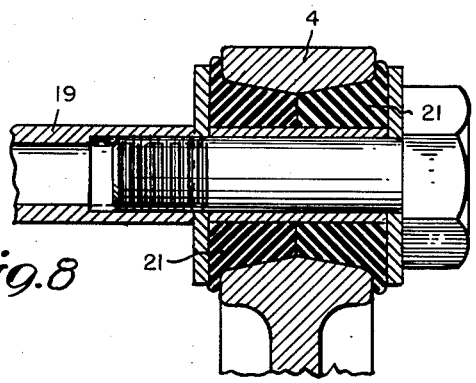
Figure 9:
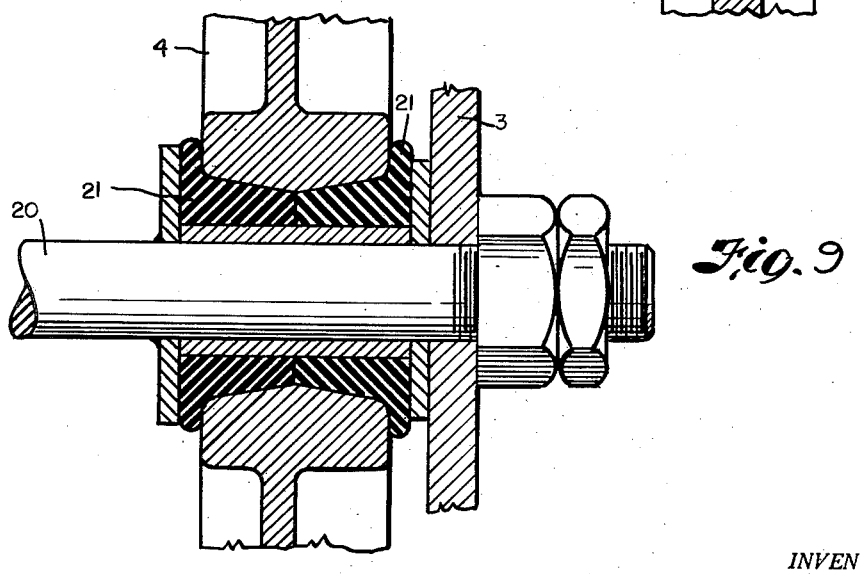
Figure 12:
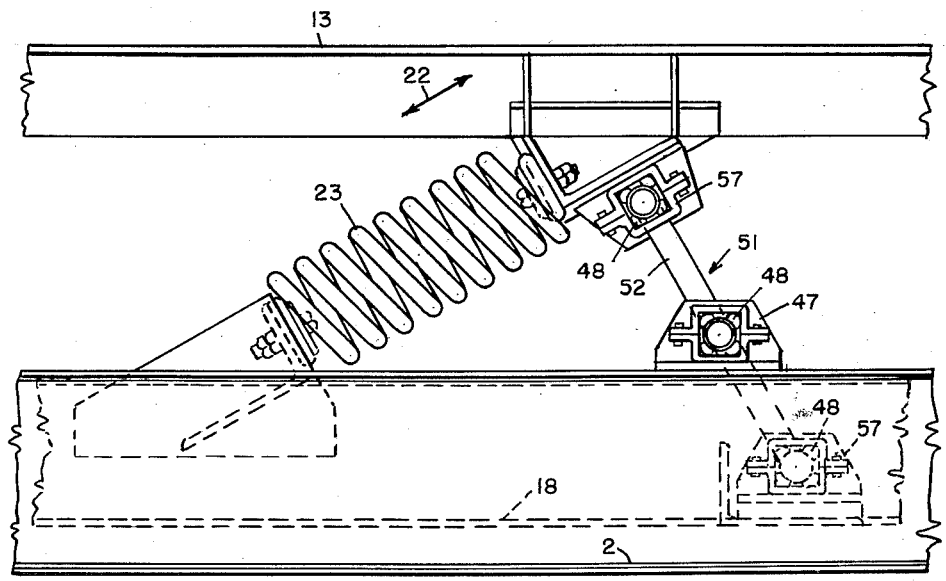
Figure 13:
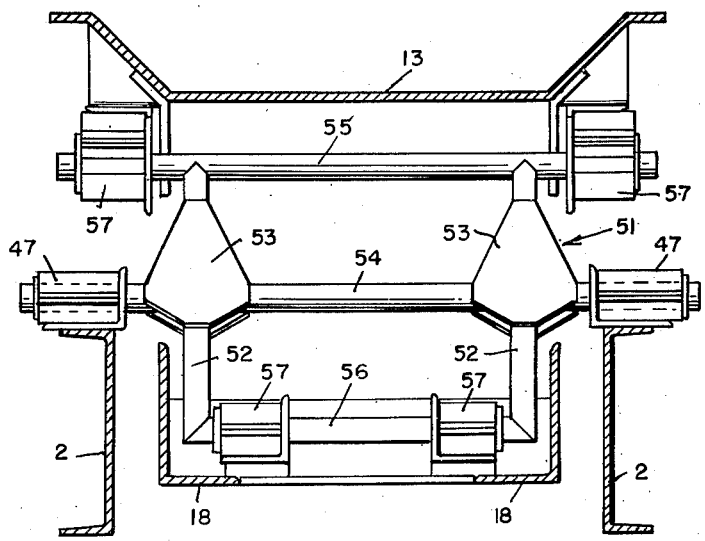
Figure 10:
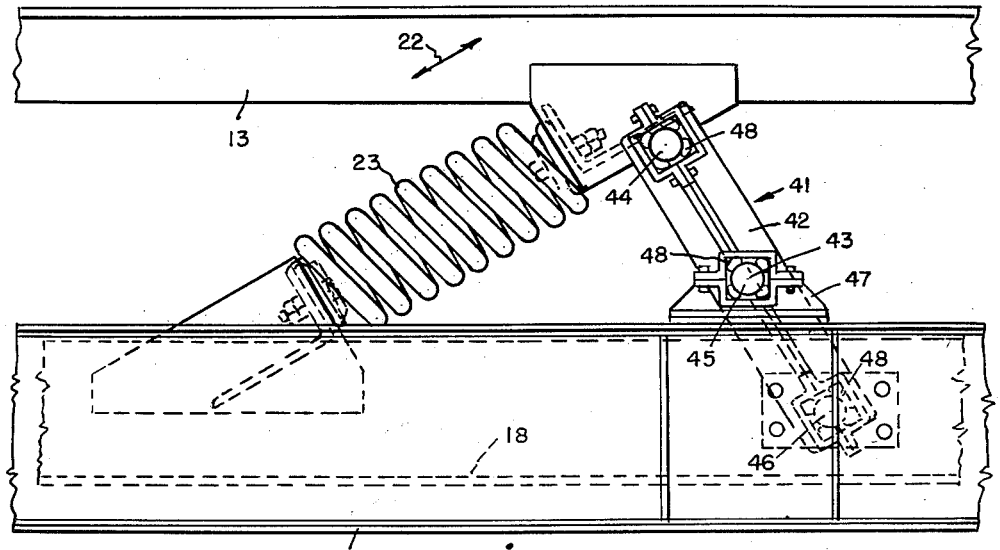
Figure 11:
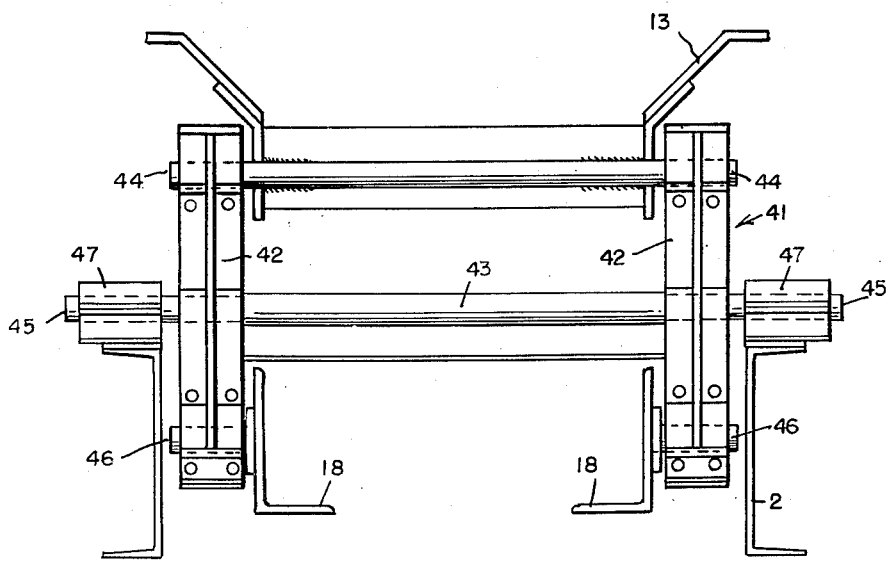

Figs. 8 and 9 are cross-section views on an enlarged scale taken substantially along the lines 8—8 and 9—9 respectively, Fig. 1;

Figs. 10 and 11 are side elevation and end elevation views respectively of a modified link mechanism for achieving vibration of a conveyor and counterbalance therefor in phase opposition and for achieving lateral stability of the conveyor; and Figs. 12 and 13 are views similar to Figs. 10 and 11 respectively showing still a different form of link for achieving the same general results as obtained with the link shown in Figs. 10 and 11.

Referring now more particularly to the drawings and first to Figs. 1 and 2 thereof, the conveyor 1 shown therein is of the vibrating horizontal trough type which includes a frame 2 which has mounted on opposite sides thereof and at suitably spaced intervals therealong the blocks 3 for pivotally supporting obliquely disposed parallel arms 4 intermediate their ends. Also mounted on said frame 2 is an electric drive motor 5 which, through the pulley 6 and the belt 7 running thereover, drives an eccentric shaft 8 which has a pulley 9 thereon (keyed on left hand end of shaft 8 as viewed in Fig. 2A) and which is supported for rotation in the journal blocks 10, the latter being fixedly mounted on opposite sides of said conveyor frame 2.

The eccentric rod 11 is provided with a journal block 12 rotatable on an eccentric or crank pin portion 8A (see Fig. 2A) of said eccentric shaft 8 whereby, during each revolution of said shaft, the upper end of said rod 11 where connected to the conveyor trough or pan 13 will reciprocate along a path generally parallel to the path described by the upper ends of the arms 4. Said eccentric rod 11 is pivotally connected to the conveyor trough or pan 13 through the intermediary of a curved or bent arm 14, which arm is pivotally connected at one end to a bracket 15 fixed on the conveyor trough 13 and at the other end to one end of an extensible link 16, the latter preferably being in the form of a hydraulic shock absorber having its other end pivotally connected to the conveyor trough bracket 17.

The pivots between said rod 11 and said arm 14 and between said arm 14 and said conveyor bracket 15 are so located that said conveyor pan 13 may assume different positions according to the static load of conveyable material thereon without imposing corresponding stress on said eccentric rod 11. The location of these pivots relative to the pivot between arm 14 and link 16 is such that a relatively small force (to which the shock absorber 16 is readily responsive) is transmitted to said shock absorber by the settling of the conveyor trough 13 under load.

The upper ends of said obliquely disposed arms 4 are pivotally connected at their upper ends to said brackets 15 of the conveyor trough 13 and pivotally connected at their lower ends to a counterbalance frame 18.

As best shown in Figs. 2, 8 and 9, rods 19 are supported in said bracket 15 and said counterbalance frame 18 and a rod 20 is similarly supported in said blocks 3. The pivotal connections of said arms 4 on said rods 19 and 20 include rubber or rubber-like bushings 21 which serve as resilient mountings and which enable assembly of said arms and even though the axes of the openings therein and of the rods 19 and 20 are somewhat misaligned.

The conveyor trough 13 is resiliently supported for vibration along a path as indicated by the line 22 as by means of one or more coil springs 23 having one end bolted or otherwise secured to the conveyor trough 13 and the other end similarly secured to the counterbalance frame 18.

As is now apparent, when the eccentric shaft 8 is driven at a speed corresponding to the natural frequency of the spring mounting of the conveyor trough 13, the stroke thereof as measured by the reciprocation of the eccentric driven rod 11 will be positively and uniformly transmitted to the conveyor trough 13 through the curved arm 14 and, at such frequency of operation, the hydraulic shock absorber or extensible link 16 will remain of substantially uniform length since the same resists any such rapid change in length. It will be seen that the vibration of the trough 13 along the path 22 will cause oscillation of the obliquely disposed arms 4 whereby the counterbalance frame 18 is vibrated along exactly the same path as the conveyor trough, but in direct phase opposition, whereby the operation of the conveyor 1 is balanced, except for the driving thrust or reaction which is transmitted by the eccentric shaft 18 to the pillow blocks 10 thereof to the conveyor frame 2. It is further evident that any increase in the load of the conveyed material which will be tossed angularly upward from the conveyor trough as the latter vibrates will cause the conveyor trough to gradually settle on its spring mounting, such gradual settling being permitted by change in length of the hydraulic shock absorber 16 which is capable of gradual change even under very slight loads.

With respect to the driving thrust or reaction of aforesaid, it is to be noted that said thrust is of relatively small magnitude because, to effect vibration of the conveyor trough 13 and counterbalance frame 18 in resonance with the natural frequency of the spring mounting, requires only the application of forces which are sufficient to overcome the damping forces; namely, the internal friction of the spring or springs 23 and the friction in the several pivots. The magnitude of such force will generally be only about ten percent of that which would be required if the conveyor were not resiliently supported or if the conveyor were resiliently supported but operated at a frequency different from that of the natural frequency of its spring mounting.

In connection with the starting of the conveyor, a very slow rotation of the eccentric drive shaft 8 and thus slow reciprocation of rod 11 will cause the curved arm 14 to pivot about its pivotal connection to bracket 15 thereby causing alternate lengthening and shortening of the hydraulic shock absorber 16 and transmitting but a small force to the conveyor trough 13. As the eccentric drive shaft 8 picks up speed, the hydraulic shock absorber 16 will become progressively more and more rigid until finally, at resonant speed of said eccentric drive shaft, the reciprocations of rod 11 are so rapid that the hydraulic shock absorber becomes, for all practical purposes, a solid fixed length link, except for any gradual raising or lowering of the conveyor trough 13 as effected by a change in the load of the conveyable material thereon. When the conveyor is operated empty, the amplitude of vibration will be the same as when the conveyor is fully loaded; and, therefore, there is no damping under load or destructive amplitude vibration when the conveyor is operated empty.

The conveyor shown in Fig. 3 is substantially the same as that shown in Fig. 1, except that the eccentric driven rod 31 is pivotally connected directly to the conveyor trough bracket 15 and that the curved arm 14 and the hydraulic shock absorber or equivalent extensible link 16 have been omitted. It has been discovered that in the case of light-weight, light-duty conveyors having a stroke of approximately ½" maximum and designed for operation at a natural frequency of about 700 cycles per minute in order to achieve a worthwhile conveying speed, the springs for such conveyors are sufficiently stiff that the conveyors will settle only about ⅕ of the stroke under conveyed loads. In such case the rubber bushings 21 (see Figs. 8 and 9) in the pivots of arms 4 will accommodate such degree of settling while preventing destructive amplitude vibration of the conveyor when operated empty and will prevent damping under load. Accordingly, under these conditions of operation, the conveyor of Fig. 3 has substantially the same desirable characteristics as those just described in connection with Figs. 1 and 2 and, therefore, the details of the Fig. 3 conveyor structure and operation thereof need not be now repeated.

Figure 4:
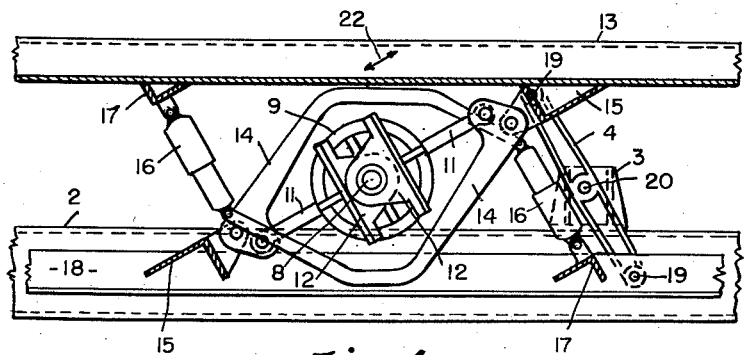

The conveyor structure illustrated in Fig. 4 differs from that illustrated in Fig. 1 in that the eccentric drive mechanism is disposed between the conveyor trough 13 and the counterbalance frame 18 so that the entire conveyor structure is balanced even to the extent of balancing the driving thrust or reaction so that no vibrations whatever are transmitted to the building structure through the conveyor frame 2.

As in Fig. 1, one curved arm 14 is pivotally connected at one end to the conveyor trough bracket 15 and at the other end to one end of an extensible link such as the hydraulic shock absorber 16. The eccentric drive shaft 8 is provided with another crank pin portion for a second journal block 12 and rod 11, the latter of which is pivotally connected to another curved arm 14 which has its opposite ends pivotally connected to a bracket 15 of the counterbalance frame and to one end of another hydraulic shock absorber 16, said latter shock absorber being pivotally connected at its other end to a bracket 17 on said counterbalance frame. Said shaft 8 is preferably journalled on said frame 2 and is provided with a pulley 9.

Therefore, in the Fig. 4 conveyor structure, the reactions of the forces transmitted by the rods 11 to the conveyor trough 13 and counterbalance frame 18 will be equal and opposite with the result that no forces are transmitted through the shaft 8 to the conveyor frame 2. Another distinction between the Fig. 4 construction and that of Fig. 1 is that the drive itself forces the conveyor trough and the counterbalance frame to make equal and opposite movements which otherwise might vary within the elastic limits of the rubber bushing support arm connections to the pan 13 and to the counterbalance frame 18.

Figure 5:
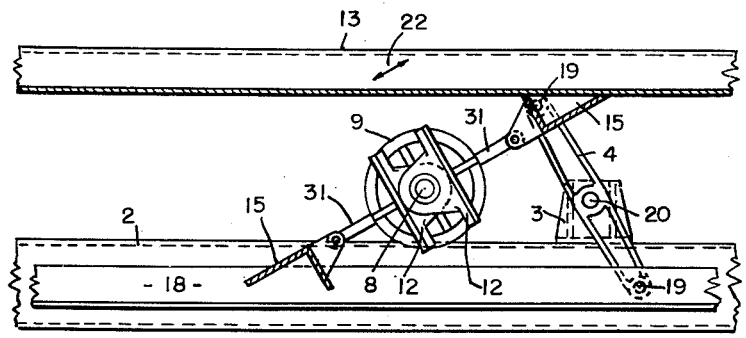

The structure illustrated in Fig. 5 corresponds with that of Fig. 4, except for the omission of the curved arms 14 and the hydraulic shock absorbers 16, which parts can be dispensed with in some instances, as, for example, where the settling of the conveyor trough 13 under load amounts to no more than about one-fifth of the amplitude of vibration. This was explained fully in connection with Fig. 3 and need not now be repeated.

Figure 6:
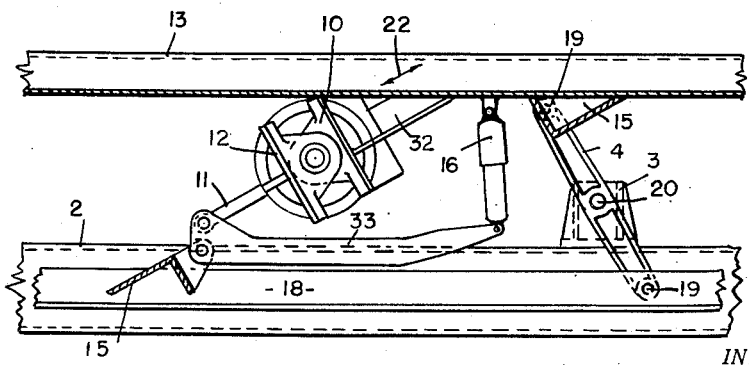

The structure illustrated in Fig. 6 is generally the same as that of Figs. 1 and 4, except that the eccentric drive shaft 8 is mounted in pillow blocks 10 which are securely mounted to brackets 32 on the underside of the conveyor trough 13. Here, again, as in connection with Fig. 4, the drive reactions of the eccentric shaft 8 are not transmitted to the building structure or to the conveyor frame 2. In this conveyor structure, the eccentric driven rod 11 is pivotally connected to an arm 33 which has its opposite ends pivotally connected to a bracket 15 of the counterbalance frame 18 and to one end of a hydraulic shock absorber or like extensible link 16, the other end of the latter being pivotally connected to the conveyor trough 13. Thus, the reciprocatory motion of the eccentric driven rod 11 causes vibration of the counterbalance frame 18 and, through such vibration, the conveyor trough 13 is vibrated, except in direct phase opposition, by reason of the pivotal mounting of the supporting arms 4 between their ends on the supporting frame 2 and at their ends on the conveyor trough 13 and on the counterbalance frame 18.

Obviously, instead of mounting the eccentric drive shaft 8 to the conveyor trough 13, the arrangement may be reversed so that said eccentric drive shaft 8 is journalled in pillow blocks 10 secured directly to the counterbalance frame 18. Since the operation of the Fig. 6 modification is clearly evident from the description of the operation of the Fig. 1 construction, repetition of such operation has been omitted.

Figure 7:
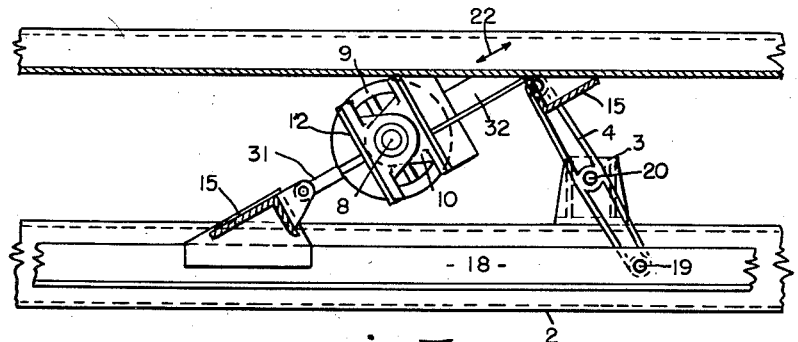

The Fig. 7 conveyor structure is generally the same as that of Fig. 6, except that the arm 33 and hydraulic shock absorber 16 have again been omitted for the same reasons that corresponding parts in the Figs. 3 and 5 constructions were omitted.

Referring now to Figs. 10 to 13, and first Figs. 10 and 11, the supporting arm unit 44 is disposed obliquely between and pivotally connected at its ends to the conveyor trough 13 and to the counterbalance frame 18 and pivotally connected intermediate its ends to the support frame 2, each said arm unit comprising parallel spaced apart arms 42 which are fixedly mounted in spaced parallel relation on a rod 43 so as to eliminate possibility of lateral vibration of the conveyor trough 13 or of the counterbalance frame 18. A further distinction in these supporting arm units 41 from the arms 4 is that instead of employing rubber or rubber-like bushings 21 at the pivots as shown in Figs. 8 and 9, the resilient connections comprise circular cross-section pivots 44, 45, and 46 extending loosely or with considerable clearance into generally square openings formed in the case of pivots 44 and 46, in the supporting arm 42 and, in the case of pivots 45, in members 47 secured to supporting frame 2. In the four corners of each such square opening compressed between the walls of the opening and the peripheral surface of the respective pivots 44, 45 and 46, are disposed cylindrical members 48 of rubber or rubber-like material and, as will be apparent, the oscillation of the supporting arm unit 41 will cause a constant kneading action of the rubber members 48 which greatly enhances the life thereof and also, since there is a wedging action on said rubber members 48, the same do, to some extent, have an action corresponding to that of the hydraulic shock absorbers 16, whereby quick changes in amplitude are effectively resisted while slow or gradual changes are permitted.

The supporting arm structure 51, as illustrated in Figs. 12 and 13, is substantially the same as that of Figs. 10 and 11, except that in Figs. 12 and 13, the supporting arms 52 are rigidly secured together against relative distortion by means of gusset plates 53 welded or otherwise firmly secured relative to a central cross shaft 54 whereby the cross shafts 55 and 56 also are maintained parallel and secured against relative distortion. Thus, again, lateral stability is imparted to the conveyor trough 13. In this case, the pivots at the ends of the structure are on the unit 51 and the members 57 fixed to the trough 13 and to the counterbalance frame 18 provide the square openings for the rubber members 48.

Other modes of applying the principle of the invention may be employed, change being made as regards the details described, provided the features stated in any of the following claims, or the equivalent of such, be employed.

We therefore particularly point out and distinctly claim as our invention:

1. A conveyor comprising a trough adapted to support conveyable material thereon and to be vibrated to convey such material therealong, a counterbalance, means interconnecting and supporting said trough and counterbalance for vibration in phase opposition, resilient means disposed between said trough and counterbalance, drive means operatively associated with said trough and counterbalance to impart to at least one of them substantially uniform amplitude vibration in resonance with the natural frequency of said resilient means, and means providing a floating connection between said drive means and that one of said trough and counterbalance to which vibration is imparted by said drive means whereby said trough and counterbalance may shift to different relative positions according to the load of material on said trough while substantially uniform amplitude vibration of said trough and counterbalance is maintained.

2. The conveyor of claim 1 wherein said last-named means comprises an arm, and a hydraulic shock absorber, said arm being connected to said drive means and to said conveyor to transmit vibration to the latter and to swing upon such shifting, said shock absorber being mounted to oppose such swinging of said arm and constituting a substantially rigid link at such natural frequency vibration while permitting gradual shifting as aforesaid according to the load of conveyable material on said trough.

3. The conveyor of claim 1 wherein said last-named means comprises a rubber-like element, and said resilient means is arranged to yield but a minor fractional portion of the amplitude of vibration owing to change in load of conveyable material on said trough, such yielding and consequent shifting of said trough and counterbalance being accommodated by deformation of said element.

4. A conveyor comprising a trough adapted to support conveyable material thereon and to be vibrated to convey such material therealong, a counterbalance parallel to said trough, obliquely disposed parallel levers pivotally connected at their opposite ends to said trough and counterbalance respectively to maintain the latter in parallel relation to each other, a support having a pivotal connection with said levers intermediate the ends of said levers whereby said trough and counterbalance are vibrated in phase opposition along paths as described by the pivotal connections between said levers and said trough and counterbalance, resilient means disposed between said trough and counterbalance, drive means operatively associated with said trough and counterbalance to impart to at least one of them substantially uniform amplitude vibration in resonance with the natural frequency of said resilient means, and means providing a floating connection between said drive means and said one of said trough and counterbalance whereby said trough and counterbalance may shift to different relative positions according to the load of material on said trough while substantially uniform amplitude vibration of said trough and counterbalance is maintained.

5. The conveyor of claim 4 wherein said drive means is mounted on said support, and said means forming a floating connection comprises offset pivots on said drive means and said trough, an arm connected to said pivots for swinging movement according to such shifting of said trough and counterbalance, and a hydraulic shock absorber pivotally connected at one end to said trough and at the other end to said arm to thus substantially positively oppose swinging of said arm while the conveyor is operated at natural frequency but permitting a gradual swinging of said arm owing to such shifting.

6. The conveyor of claim 4 wherein said drive means is mounted on said support, and said means forming a floating connection comprises a rubber-like element disposed between said drive means and said trough, and said resilient means is arranged to yield but a minor fractional portion of the amplitude of vibration owing to change in load of conveyable material on said trough, such yielding and consequent shifting of said trough and counterbalance being accommodated by deformation of said element.

7. The conveyor of claim 4 wherein said drive means imparts opposite phase vibration to the other of said trough and counterbalance so as to positively vibrate both said trough and counterbalance and said means forming a floating connection comprises two pairs of offset pivots one pair on said drive means and said trough and the other pair on said drive means and said counterbalance, two arms each connected to one of the two pairs of pivots for swinging movement according to such shifting of said trough and counterbalance, and two hydraulic shock absorbers each pivotally connected at one end to said trough and counterbalance respectively and at the other end to said trough and counterbalance arms respectively to thus substantially positively oppose swinging of said arms while the trough and counterbalance are vibrated at such natural frequency while permitting a gradual swinging of said arms owing to such shifting.

8. The conveyor of claim 4 wherein said drive means imparts opposite phase vibration to the other of said trough and counterbalance so as to positively vibrate both said trough and counterbalance, and said means forming a floating connection comprises rubber-like elements each disposed between said drive means and said trough and between said drive means and said counterbalance, and said resilient means is arranged to yield but a minor fractional portion of the amplitude of vibration owing to change in load of conveyable material on said trough, such yielding and consequent shifting of said trough and counterbalance being accommodated by deformation of said elements.

9. The conveyor of claim 4 wherein said drive means is mounted on the other one of said trough and counterbalance and said means forming a floating connection comprises offset pivots on said drive means and said other one of said trough and counterbalance, an arm connected to said pivots for swinging movement according to such shifting of said trough and counterbalance, and a hydraulic shock absorber pivotally connected at one end to said one of said trough and counterbalance and at the other end to said arm to thus substantially positively oppose swinging of said arm while the conveyor is operated at natural frequency permitting a gradual swinging of said arm owing to such shifting.

10. The conveyor of claim 4 wherein said drive means is mounted on the other one of said trough and counterbalance, and said means forming a floating connection comprises a rubber-like element disposed between said drive means and said one of said trough and counterbalance, and said resilient means is arranged to yield but a minor fractional portion of the amplitude of vibration owing to change in load of conveyable material on said trough, such yielding and consequent shifting of said trough and counterbalance being accommodated by deformation of said element.

11. The conveyor of claim 4 wherein rubber-like elements are disposed at the pivots between said levers and said trough, said support, and said counterbalance.

12. The conveyor of claim 4 wherein said levers each comprise a cross-member, and a pair of spaced apart parallel arms fixed on said cross-member, said cross-member providing at its ends pivots for pivotally mounting said lever on said support, and said arms providing at their ends pivotal connections with said trough and counterbalance.

13. The conveyor of claim 12 wherein rubber-like elements are disposed in the pivots between said levers and said trough, said support, and said counterbalance.

14. In a conveyor the combination of a material handling trough assembly, a counterweight assembly, spaced substantially inflexible links of equal length arranged substantially parallel and pivotally connected at their opposite ends respectively to said trough and counterweight, fixed supports pivotally supporting said links intermediately of their ends, spring means extending between said trough and counterweight and arranged to resiliently oppose relative movement between said trough and counterweight, power means mounted on one of said assemblies and having a driving connection with the other for cyclically varying by a fixed amplitude the distance between said assemblies, and means associated with said power means compensating for differences in the distance between said assemblies due to influences such as load on said trough while maintaining substantially constant said amplitude of relative movement derived from said power means.

References Cited in the file of this patent

UNITED STATES PATENTS

| | | |
|---|---|---|
| 1,495,850 | Jacquelin | May 27, 1924 |
| 1,986,102 | Cole | Jan. 1, 1935 |
| 2,241,527 | Schieferstein | May 13, 1941 |
| 2,458,077 | Jacobsen | Jan. 4, 1949 |
| 2,638,206 | Musschoot et al. | May 12, 1953 |
| 2,664,995 | Renner | Jan. 5, 1954 |